United States Patent [19]

Chieng

[11] Patent Number: 5,154,290
[45] Date of Patent: Oct. 13, 1992

[54] CASSETTE JACKET FOR A 3.5 DISKETTE

[76] Inventor: Walter Chieng, 1F, No. 12, Alley 18, Lane 277, Sec. 6 Chung Shan N. Rd., Taipei, Taiwan

[21] Appl. No.: 729,039

[22] Filed: Jul. 12, 1991

[51] Int. Cl.⁵ .............................. B65D 85/30
[52] U.S. Cl. .................................. 206/444
[58] Field of Search ................ 206/444, 312, 313

[56] References Cited

U.S. PATENT DOCUMENTS 4,724,501  2/1988  Buchwald et al. ............... 206/313

FOREIGN PATENT DOCUMENTS 2379131  9/1978  France ........................ 206/312
 320692 12/1989  Japan ......................... 206/444
2181592  4/1987  United Kingdom ............ 206/444

*Primary Examiner*—William I. Price
*Attorney, Agent, or Firm*—Notaro & Micholas

[57] ABSTRACT

A cassette Jacket for a 3.5" diskette comprising a front plate, rear plate, two fixed-side leaf springs, and a bottom plate. The front plate covers the read/write sector opening of the diskette. The rear plate covers the center opening and the read/write sector opening of the diskette. A retainer located on each leaf spring is received in an opening located in each side of the cassette to fix the Jacket on the cassette.

5 Claims, 2 Drawing Sheets

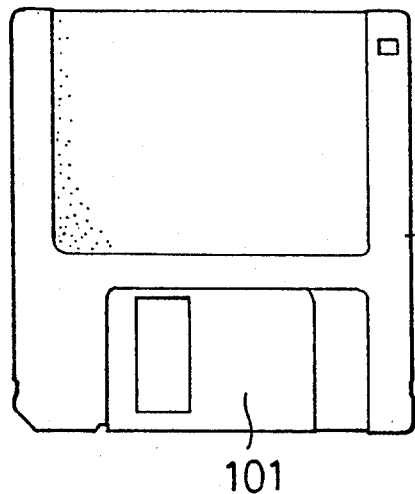
FIG. IA
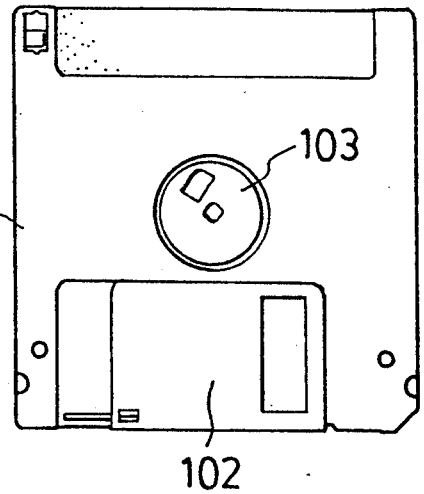
FIG. IB
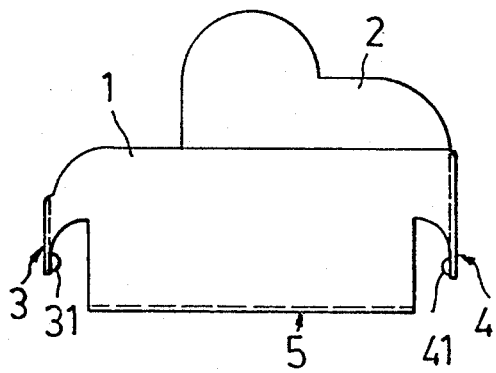
FIG. 2
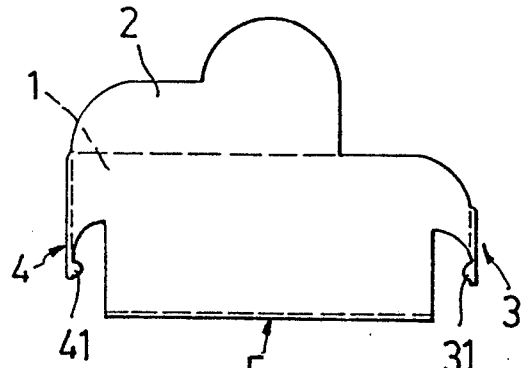
FIG. 3

CASSETTE JACKET FOR A 3.5 DISKETTE

SUMMARY OF THE INVENTION

The present invention relates to a cassette jacket for a 3.5" diskette.

Recently portable PCs (Personal Computers) are more and more popular and get more market shares because not only the price keeps going down but also the function has been improved a lot. Most of all the competitive function with the desk-top computers and the nonlimitation of the space. A continuous expansion of market further convinces that it is the trend viewing the development of note book computers to which electronic research institutes and various major computer markers are devoted.

It is generally understood that, the specification of conventional diskette loading cases available today includes 5, 10, 40, 50, 80 or 100 pack only. If the user needs to carry one or two diskette(s), a case specified for loading 5 or 10 diskettes is too big to meet actual requirement or liable to get diskettes damaged due to bumping. Providing the user loads one or two diskette(s) in the pocket, dust and cotton flock of clothes is liable to intrude/damage the diskette from the center opening or the seam in the leading or rear side of read/write sectors of diskette. If it is a blank diskette you may don't need to care of the damage, but if there is valuable data in it, the damage would be uncountable. Moreover if the user has to transmit the data to expand business, it will be even more necessary to protect the diskette. The user who uses a number of diskettes for data storage should need a reliable and safe cassette jacket to protect the diskette and insure data against damage.

To meet the demand as mentioned above, the inventor has devoted himself to relevant research and development and eventually accomplished a light-weighted, small and easily-portable cassette jacket for loading and protecting a 3.5Δ diskette.

A cassette jacket, specifically designed for protecting a 3.5Δ diskette according to the present invention, comprises a front plate, a rear plate, two leaf springs connected at the front and rear plates, and a bottom plate connected at the bottom of the cassette jacket. The cassette jacket protects the diskette 100 perfectly from incidental damage. More specifically, the front plate is fitted to cover the front portion of a read/write sector opening door of the diskette, the rear plate to cover the rear portion of a sector opening door and a center drive opening. Each side of the jacket includes an elastically mounted retainer projection fitted to retain a hole on the right and left side of diskette whereby the jacket is firmly held to the diskette. Said cassette jacket for 3.5Δ diskette did really provide a more effective protection for it. The present invention shall be better understood after considering the following detailed specification together with accompanying drawings wherein:

BRIEF DESCRIPTION OF THE DRAWINGS

FIGS. 1A and 1B are a respective front and rear views showing the structure of a 3.5Δ diskette.

FIG. 2 is a front elevational view of the present invention.

FIG. 3 is a rear view of the present invention.

DETAILED DESCRIPTION OF THE PREFERRED EMBODIMENT

Figure 4:
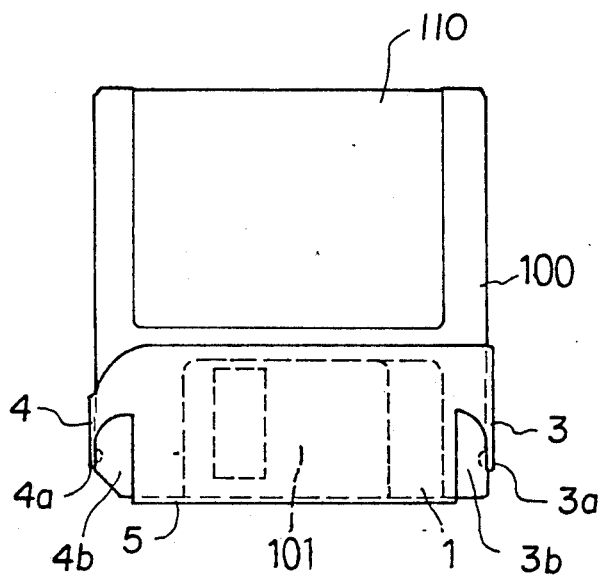
FIG. 4 is an elevational view when the diskette is attached to the invention.

Referring to FIGS. 2 and 3 wherein the present cassette jacket comprises a front plate 1, a rear plate 2, two spring sheets or leaf springs 3 and 4, and a bottom plate 5 wherein said front plate is rectangular, and the rear plate in the shape as shown in FIG. 3 and each spring sheet 3 and 4 including either of retainer 31 and 41 and the bottom plate 5 to form the complete cassette jacket.

Referring to the embodiment of the present cassette jacket shown in FIG. 4 a diskette is connected therein wherein the front plate 1 is fitted to cover a front portion of a read/write sector opening door 101 of diskette 100 for preventing dust intrusion without interference with the portion where a label is attached, to facilitate identifying for users.

Figure 5:
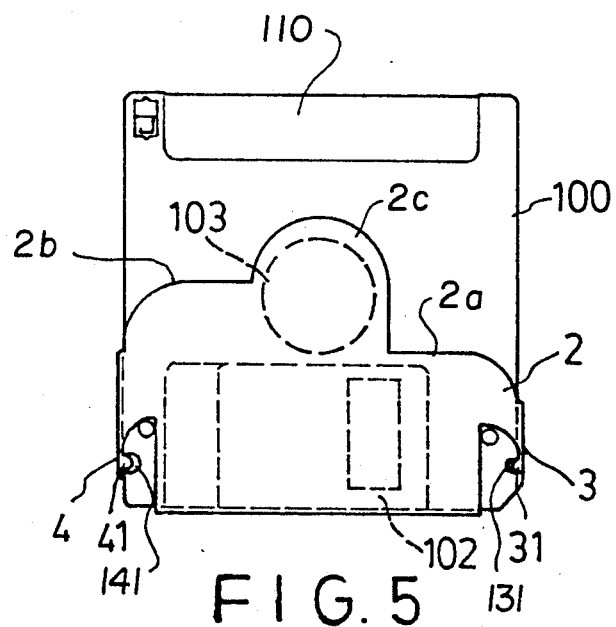
FIG. 5 is a rear view when the diskette is attached to the invention.

Still referring to the embodiment shown in FIG. 5, the rear plate 2 appearing in the shape as shown in FIG. 5, is fitted to cover a rear portion of a read/write sector opening door 102 and center drive opening 103 of the diskette for preventing dust or chips from intrusion to damage the diskette; the spring sheets 3 and 4 respectively in the right and left side of the jacket, each having a retainer 31 or 41 projecting thereon. Said two retainers 31 and 41 designed to match the holes in respective sides of a diskette, can be favorably squeezed into the holes when the diskette is cased in the cassette jacket to hold the diskette securely without risk of breaking away.

As clearly shown in the drawings, and particularly at FIGS. 4 and 5, the front plate 1 is generally rectangular to cover the end of the diskette 100 carrying the sector door, and in particular, the front portion 101 of the sector door. The spring sheets or leaf springs 3, 4 are each connected between the front and rear plates of the jacket and have free ends or portions 3a and 4a respectively, extending toward the jacket bottom 5, and separated from the front plate 1 by respective blind channels 3b, 4b.

As best shown in FIG. 5, the rear plate 2 has a low shoulder 2a and a high shoulder 2b with a curved projection 2c between the shoulders which is shaped to cover the drive opening 103. The retainers or retaining projections 31, 41 which extend inwardly from each respective leaf spring 3, 4, engage semicircular recesses 131 and 141 respectively, which are present in conventional 3.5Δ diskettes 100.

The size of the front and rear plates 1, 2 is selected to only cover part of the end surface of the diskette 100, and, on the front side of the diskette, to expose a label containing area 110 which extends over a large surface of the front of the diskette, and on the rear side to expose a small label area 110 on the rear of the diskette as shown in FIGS. 4 and 5.

To conclude the above statement, the present invention provides a novel design/shape/structure of a cassette jacket and has met the requirement of a patent.

What is claimed is:

1. A cassette jacket for a 3.5" diskette having a front surface, a rear surface, one end with a read/write sector opening door having a front portion on the front surface of the diskette and a rear portion on the rear surface of the diskette, the diskette having an opposite end with a label receiving area, the diskette further including at its one end and on its rear surface, a pair of recesses on opposite sides of the rear surface, the jacket comprising:
- a front plate adapted for covering the front surface at the one end of the diskette;
- a rear plate adapted for covering the rear surface at the one end of the diskette;
- a pair of leaf springs connected between the front and rear plates on respective opposite sides of the front and rear plates, each leaf spring having at least a free portion positioned adjacent each respective recess with the front and rear plates engaged over the front and rear surfaces of the diskette;
- a retainer connected to the free portion of each leaf spring for engagement into each respective recess for retaining the jacket to the diskette; and
- a bottom plate connected between the front and rear plates and extending at least partly between the sides of the front and rear plates.

2. A cassette jacket according to claim 1 wherein the diskette includes a central drive opening, the front plate being substantially rectangular in shape to cover the one end of the diskette at the front surface, the rear plate having a curved projection for covering the drive opening of the 3. A cassette jacket according to claim 2, wherein each leaf spring includes a free end forming said free portion and being separated from each of the front and rear plates by a blind channel.

4. A jacket according to claim 3, wherein the free ends of the leaf springs extend toward the one end of the diskette, with the front and rear plates engaged over the front and rear surfaces of the diskette.

5. A cassette jacket according to claim 4, wherein the rear plate includes a low shoulder on one side of the curved projection and a high shoulder on an opposite side of the curved projection.

* * * * *